United States Patent [19]

Hearne, Jr.

[11] Patent Number: 5,469,797
[45] Date of Patent: Nov. 28, 1995

[54] SUGAR CANE PLANTER

[76] Inventor: David C. Hearne, Jr., 120 Bois De Chene Dr., Opelousas, La. 70570

[21] Appl. No.: 192,740

[22] Filed: Feb. 7, 1994

[51] Int. Cl.[6] .................................................. A01C 11/00
[52] U.S. Cl. .......................... 111/200; 111/104; 111/907; 414/502; 221/225; 221/231; 91/525; 91/528
[58] Field of Search ...................... 111/200, 104, 111/907; 414/502; 221/225, 231; 91/525, 528

[56] References Cited

U.S. PATENT DOCUMENTS

| | | | |
|---|---|---|---|
| 3,468,441 | 9/1969 | Longman | 111/104 X |
| 3,478,647 | 11/1969 | Gerber et al. | 91/528 X |
| 3,946,899 | 3/1976 | Allain | 111/907 X |
| 4,084,465 | 4/1978 | Dugas | 111/907 X |
| 4,106,669 | 8/1978 | Longman | 111/907 X |
| 4,653,411 | 3/1987 | Davis, Sr. | 111/907 X |
| 4,696,241 | 9/1987 | Morellini | 111/907 X |

Primary Examiner—Randolph A. Reese
Assistant Examiner—Christopher J. Novosad
Attorney, Agent, or Firm—Robert Montgomery

[57] ABSTRACT

This invention is a multi-row full stalk sugar cane planter which utilizes a fully automatic hydraulically driven feed and distribution system to place cane stalks on the field in three or more successive rows including the row directly beneath the planter. A hydraulically driven, continuous chain, feed conveyor moves cane stalks in the semi-vertical position and in multiple columns toward a primary and optional secondary rotating distribution drum system. A pressure compensating proportioning control valve monitors pressure at the primary distribution drum motor and automatically compensates for high pressure spikes by slowing or hesitating the feed of cane stalks to the primary distribution drum. The special valve can be easily adjusted on the fly to compensate for differing field and weather conditions. A series of hydraulic secondary distribution drums are also provided to insure proper planting and placement of the cane stalks in three or more rows.

14 Claims, 7 Drawing Sheets

SUGAR CANE PLANTER

BACKGROUND OF THE INVENTION

1. Field of the Invention

The present invention relates to farming equipment in general and sugar cane planters in particular. The present invention is even more related to such planters having fully automatic, hydrostatic, pressure sensing systems for planting full stalk seed cane in three or more rows at once.

2. General Background

In the sugar cane industry, it is necessary to periodically replant the cane field with stalks in full lengths or in short length sections. The typical full stalk planter is a towed vehicle having a wheeled or tracked chassis and a bed containing a large number of stalks to be planted held in a semi-vertical position. Typically, these stalks are force fed toward a rotating drum as the result of an inclined barrier moving the whole load in the direction of the rotating drum. The drum is usually mechanically or hydraulically driven, and works in combination with a hydraulic ram or ratchet device for pushing the incline barrier and the cane toward the drum. The rotating drum is sequenced in a manner which controls the number of stalks that are allowed to be laid in the prepared row in relationship to the speed of the chassis as it moves along the furrow. In the past such planters have been restricted to planting only one row at a time due to the machines inability to control the flow of stalks to the distribution drum. In most cases as exhibited by Davis in U.S. Pat. No. 4,653,411, Longman U.S. Pat. No. 4,106,669; Allain U.S. Pat. No. 3,946,899, and Dugas U.S. Pat. No. 4,084,465; an operator is positioned on the side or directly behind the rotating drum to control the distribution process. In some cases a purely mechanical means for distributing full length cane is employed as exhibited by Longman in U.S. Pat. No. 3,468,441. In any case such distribution of full length cane stalks has been limited to one or two rows. It should also be noted that even where two row planters are disclosed, the row directly beneath the planter is not planted requiring multi-passes by the planter over the same rows.

The existing mechanical sugar cane planters have several problems which cannot be easily overcome by the average cane farmer; hence, approximately half of the sugar cane planted in the United States is done by hand. The other half is done with machinery, which is often not understood by the average field worker. As a result, such sophisticated systems require expensive maintenance service often resulting in unacceptable delays during planting. Even with the use of sophisticated electrical over hydraulic distribution and feeding systems and the use of an onboard operator, the operator, the system, or both often can not react fast enough to changing conditions to produce the kind of consistency normally resulting from hand planting. Due to the increasing cost of labor and the need to improve overall efficiency, an improved method of controlling such planting is required.

Existing drum type planters rely on the dispensing drum turning at a constant speed to meter the seed cane being planted. Usually the planter is towed at a constant speed to produce a uniform distribution. Problems occur with such systems, when the cane is loaded, often in a very random manner and in some cases mixed with vines and other vegetation and a good deal of dirt. Thus, the consistency varies within the load and with each new load. Such inconsistencies causes large clumps of tangled stalks to be compressed against the primary distribution drum resulting in jamming. Therefore, systems which rely on constant hydraulic fluid flow must compensate with wildly oscillating pressures to maintain the required torque to the rotating drum head. Such pressures may vary from 400 psi to 2400 psi within one revolution of the drum. Thus, typical pressure relief and compensator valves are required to operate hundreds of times per minute. This has proven to be impractical. Therefore, farmers attempt to minimize this effect by setting the valves with as wide a range as possible, thus sacrificing control of the planting rate, creating planting skips on the low end and piles on the high end. These systems are incapable of operating at intermediate ranges. To overcome these problems, a system is clearly needed which will deliver the cane to the distribution drum in a uniform manner and provide an efficient non-complicated method of automatically sensing the distribution of the stalks in multiple rows.

SUMMARY OF THE INVENTION

The present invention provides an improved, multi-row, full stalk sugar cane planter which utilizes a hydraulically driven, rotating primary distribution drum and multiple secondary distribution drums to place seed cane stalks on the field in three or more successive rows including the row directly beneath the planter. A hydraulically powered feed system is also provided which utilizes a continuous moving drag chain conveyor system having slats for uniformly moving the stalks along the chassis without compaction. Therefore, the inclined angle feed plate does not crush or compact the stalks against the rotating primary distribution drum. The inclined angle feed plate simply serves to hold the stalks in the proper inclined orientation while moving the load toward the primary distribution drum. An improved hydraulic system enhances the feed system by the addition of a new control valve which senses hydraulic pressure at the primary distribution drum and automatically regulates the feed rate of stalks to the primary distribution drum by increasing or decreasing the flow of hydraulic fluid to the feed motor, thus eliminating the need for an operator. This new, proportional control valve also serves as a modulator by damping out the wild pressure oscillations exhibited by the distribution drum motor as a result of jamming, matting or tangling. Thus as the pressure at the primary distribution drum motor fluctuates drastically, the hydraulic fluid flow to the feed system must be proportionally, alternatingly increased or decreased, either speeding up or slowing down the cane feed system automatically, while damping out the high pressure spikes in order to maintain a constant, cane distribution pattern.

The new control valve is easily adjustable and conveniently located so as to provide the tractor driver with a way to compensate for differing field and weather conditions. The special control valve is a simple, pressure sensitive, pilot operated valve, activated by the inlet oil pressure at the feed drum heads. Unlike other pilot operated, pressure sensing valves, this valve unit has been designed to be rugged, hand adjusted and insensitive to minor changes. As with most pressure sensing valves any change of inlet pressure simply moves the floating valve spool or piston thereby controlling the flow of oil to a hydraulic feed drive motor that is supplying seed cane to the drum by dumping a portion of the fluid back to the tank. The activating pressure range is varied by adjusting the compression of the spring loaded valve using a hand operated adjusting washer. The oversize spring used with this valve allows the valve to absorb high pressure spikes with short durations without moving the spool a significant distance. Therefore, the valve serves as a system modulator while acting as a feed speed control valve. Thus, the present invention provides a system and apparatus that is fully automatic and all hydraulic without the use of limit switches or other electrical components which often fail under the harsh conditions found in this application.

In addition, the present invention provides an improved means for distributing cane stalks in at least three rows simultaneously. This is accomplished through the use of an auxiliary set of divider plates and secondary or sub-distributing drums positioned below and perpendicular to the primary distribution drum. Improvements to the primary distribution drum included, drum pivoting, new drum teeth design and multiple guide flanges, all of which allow for even distribution of the cane stalks to the powered secondary or sub-distributing feed drums.

The present invention provides an improved, full stalk sugar cane planter with continuous, fully automatic, hydraulic fluid control to a slat chain conveyor feed system which conveys the cane rather than compacting the stalks as them move along the bed, thereby providing a more uniform feeding of the cane to the primary distribution drum.

The present invention further provides an improved full stalk sugar cane planter having a self-contained, fully automatic, hydraulic control system that is less susceptible to weather and field conditions such as mud, excessive dirt and dust, etc.

The present invention further provides an improved means for feeding and separating the cane before feeding it to secondary powered distribution drums.

Still a further object of the invention is to provide a planter having multiple storage compartments from which the cane is fed forwardly, without compaction, to a floating rotating primary distribution drum which further distributes cane to three or more rows simultaneously and which may utilize multiple rotating secondary distribution drums for more consistent planting.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
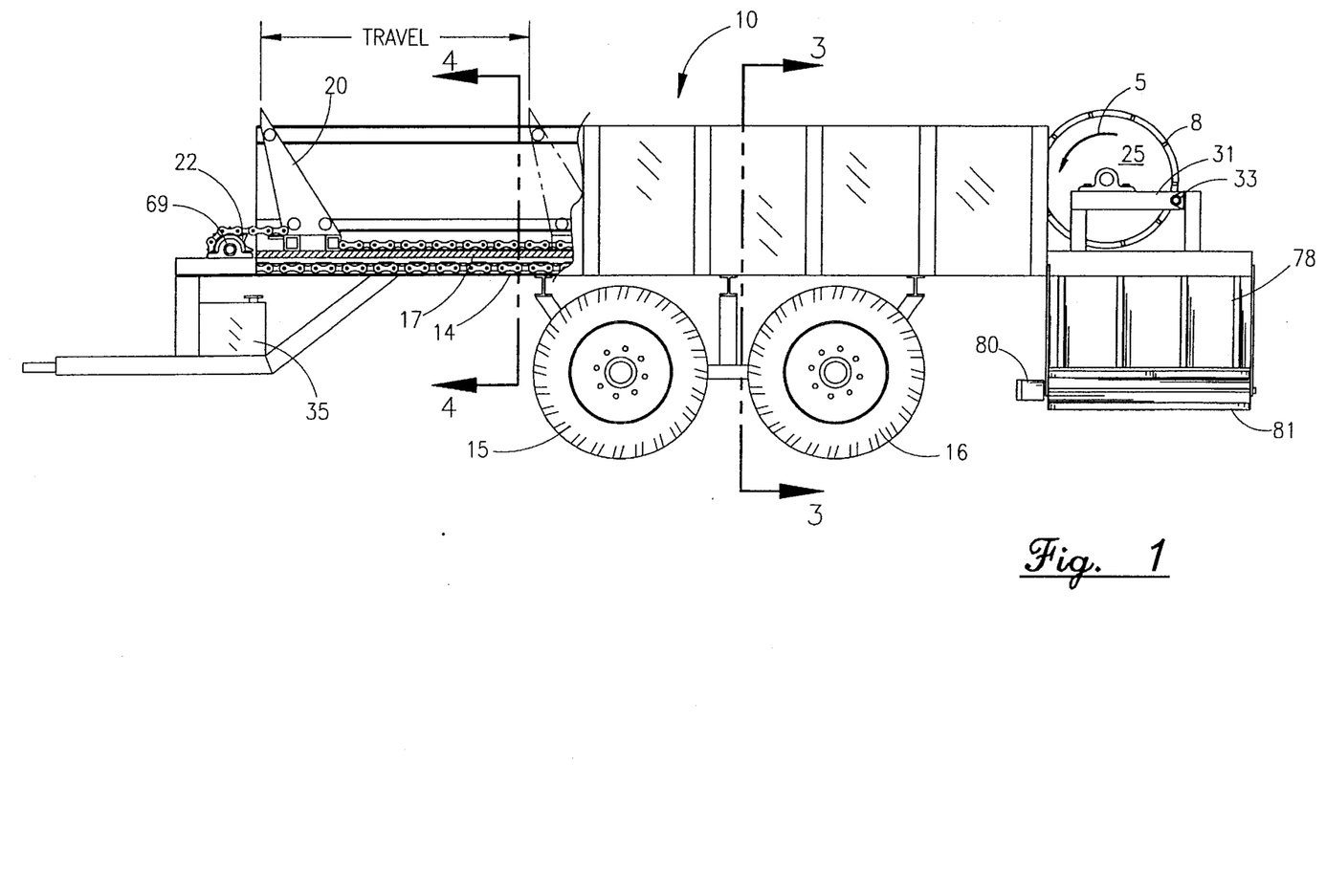
FIG. 1 is a side elevation view of the preferred embodiment of the apparatus of the present invention.
Figure 2:
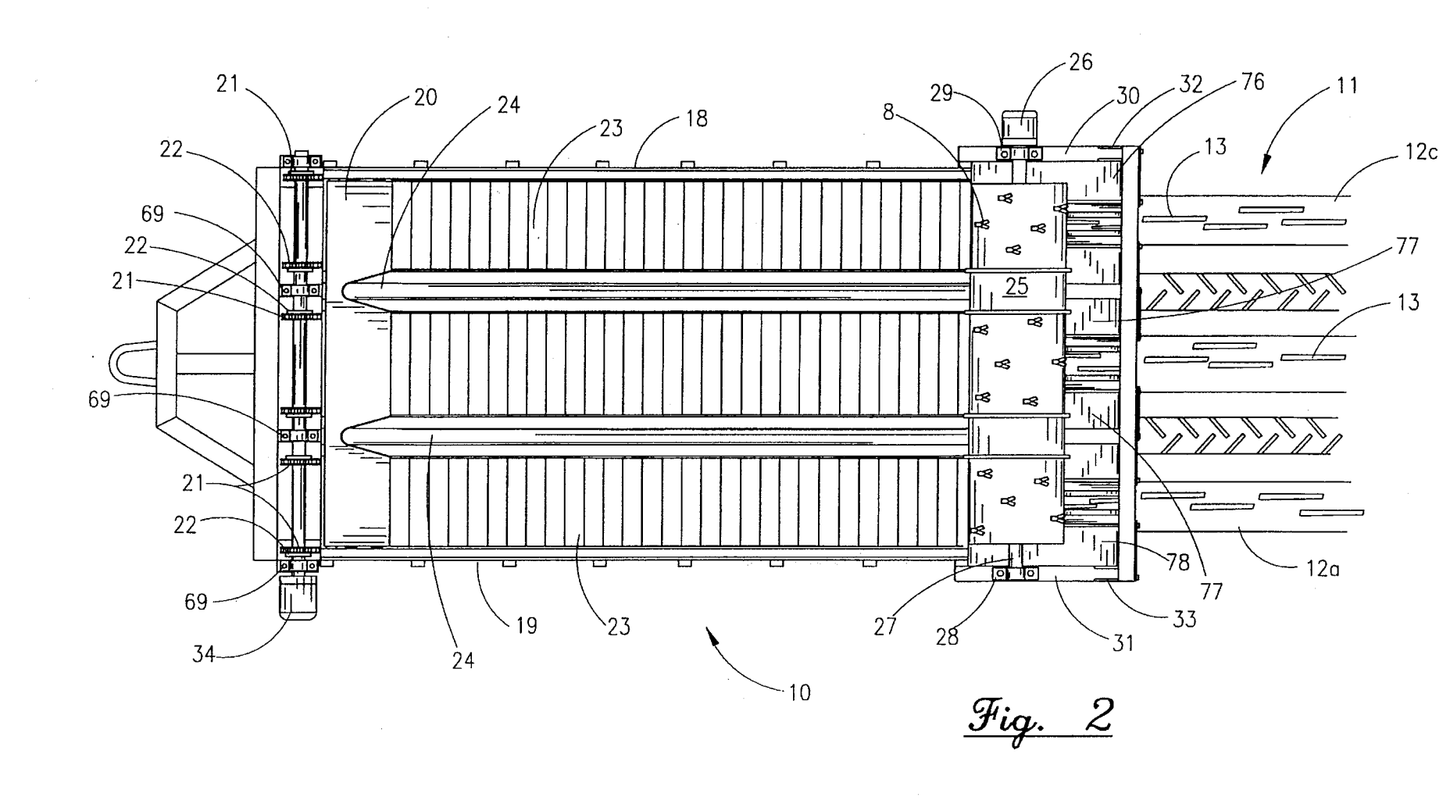
FIG. 2 is a top plan view of the preferred embodiment.

FIGS. 1 and 2 illustrate the preferred embodiment of the apparatus of the present invention designated generally by the numeral 10. In FIG. 2, the sugar cane planter 10 is shown in use upon a field surface which includes a series of opened rows 12 $a,b,c$, and alternating furrows 11. It should be understood that the cane planter 10 shown is a rear feed planter. However, the present improvements could be used equally well on a front feed planter or as a retro fit on existing planters. As seen in FIG. 2, rows 12 $a,b,c$, receive cane stalks 13 which are seed cane stalks that are deposited upon the field 11 during planting. The sugar cane planter 10 includes an elongated chassis 14 with wheels 15,16 as seen in FIG. 1, or alternatively, the chassis 14 can be supported by a track system such as a crawler track or the like.

Figure 4:
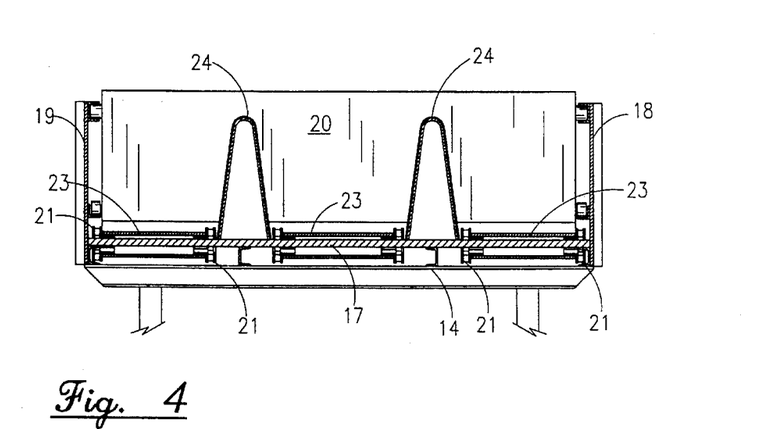
FIG. 4 is a cross sectional view of the preferred embodiment taken along sight line 4—4 in FIG. 1 with separator walls omitted for/clarity.

The chassis 14 includes a longitudinally extending bed 17 and sidewalls 18, 19 for containing cane stalks 13 in a semi-vertical position with the lower end portion of each stalk resting upon the bed 17. An angled feed plate 20 can be inclined at angles of up to 50 degrees. The feed plate 20 is attached to the continuous conveyor drag chains 21, traveling around the tail shaft and sprockets 83 and head drive sprockets 22. Further, the hydraulically driven, continuous, conveyor chains 21 and the chain slats 23 are driven by head sprockets 22 mounted on the drive shaft 68 which is mounted on the conveyor shaft bearings 69, which is in turn driven by a hydraulic motor and gear reducer 34 or such similar devices. The continuous conveyor drag chains 21 are connected periodically with structural bars or slats 23 which serve to move the lower ends of the cane stalks 13 along the chassis bed 17. As seen in FIG. 4, the semi-vertical or slanted cane 13 is divided into multiple rows within the chassis bed 17 by separator walls 24. The cane stalks 13 are also separated and partially divided by drum flanges 74,75, thus discharging the cane stalks 13 into three outflow streams and ultimately distributing them into the opened rows 12 $a,b,c$ via the rotating primary, distribution drum 25. The conveyor feed system, including the angled feed plate 20 driven by a feed motor 34, provides a smooth flow of cane stalks 13 to the rotating primary, distribution drum 25 by moving both the top and bottom of the stalks 13 thus minimizing matting, tangles and compaction. A feed reverse valve 82 is located near the towing end of the chassis 14, to provide a way for the towing vehicle operator to reverse and start the feed system drive motor 34 either mechanically or hydraulically from the towing vehicle. A remote, hydraulic, reversing valve can be used in the hydraulic circuit or a mechanical actuator lever for operating the feed motor directional valve 82 can be used to automatically reverse the feed motor 34. Thus, returning the angled feed plate 20 to its home or loading position while the planter 10 is being towed to the loading site.

The rotating primary distribution drum 25 is hydraulically driven by a hydraulic motor 26 mounted on a rotating shaft 27 supported by bearings 28, 29 carried respectively by a pair of pivotal arms 30, 31. The pivotal arms 30, 31 pivot with respect to the chassis 14 at pivots 32, 33 respectively, thus allowing the distribution drum 25 to ride upwards to some extent if jamming occurs thus relieving some pressure on the system. As the primary distribution drum 25 rotates in the direction of the arrow 5, cleats 8 engage the cane stalks 13 and transfer the cane stalks from the chassis bed 17 to the underlying field 11 and more particularly in the open rows 12 a,b,c. Virtually any hydraulic feed systems could also be used with this system; however, the conveyor drag chain and slat 21,23 embodiment has proven to be the most successful.

Problems in the system arise when the feed plate 20 is moved too rapidly toward the primary distribution drum 25 or a bundle of cane stalks 13 tangled with vines or mated by compaction produces a jamming of the primary distribution drum 25 due to the drum's inability to separate the cane stalks 13 in an even manner. As a result, such jamming causes the hydraulic fluid pressure in the hydraulic system to rise sharply and ultimately causes the feed device to cease operation. Conversely, insufficient movement by the feed plate 20 causes planting to cease or become erratic. If the planter continues to move, gaps, where no cane is planted, occur in the cane row 12.

Figure 3:
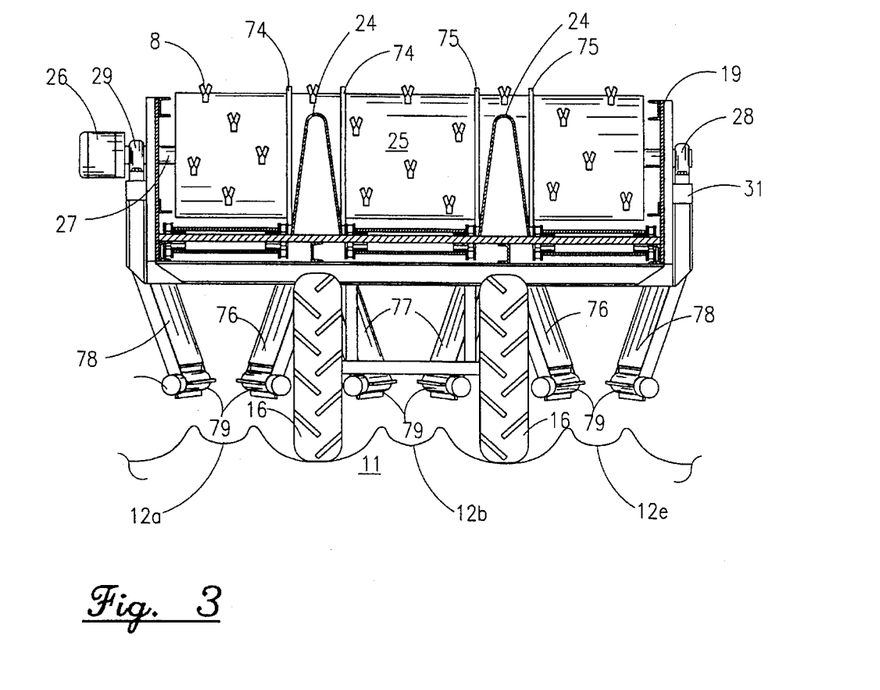
FIG. 3 is a cross sectional view taken along sight line 3—3 in FIG. 1.
Figure 5:
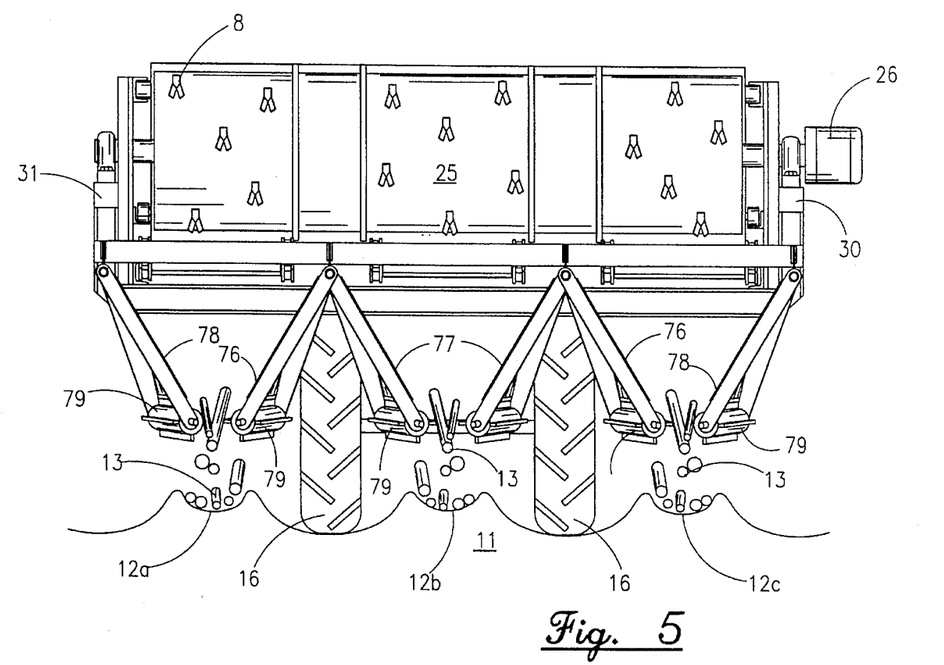
FIG. 5 is a fragmentary, rear view of the preferred embodiment illustrating the arrangement of the inventions primary and secondary rotating distribution drums and dividers for three row planting operation.
Figure 6:
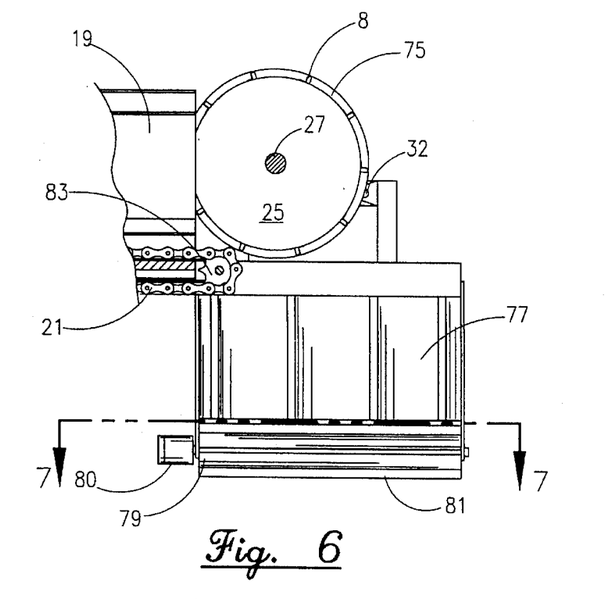
FIG. 6 is a fragmentary, side elevation of the primary and secondary distribution drums with secondary drums shown in the canted position.
Figure 7:
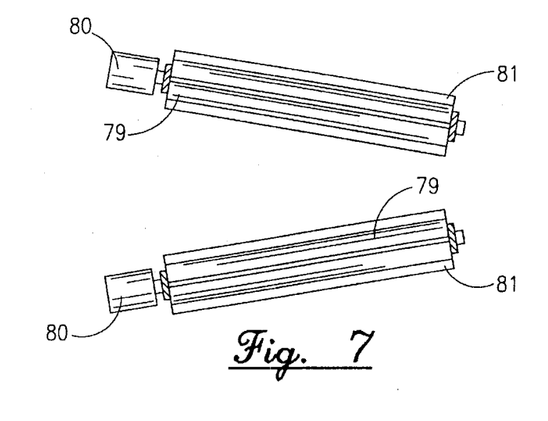
FIG. 7 is a fragmentary, plan view of the secondary distribution drums shown in the syncline position.
Figure 8:
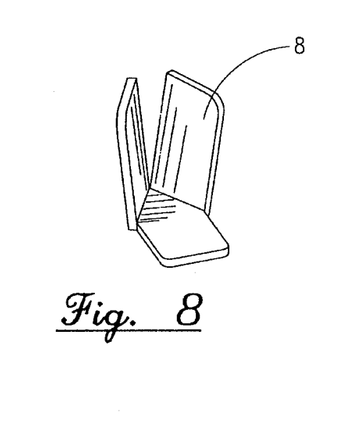
FIG. 8 is an isometric view of the primary drum cleats.
Figure 9:
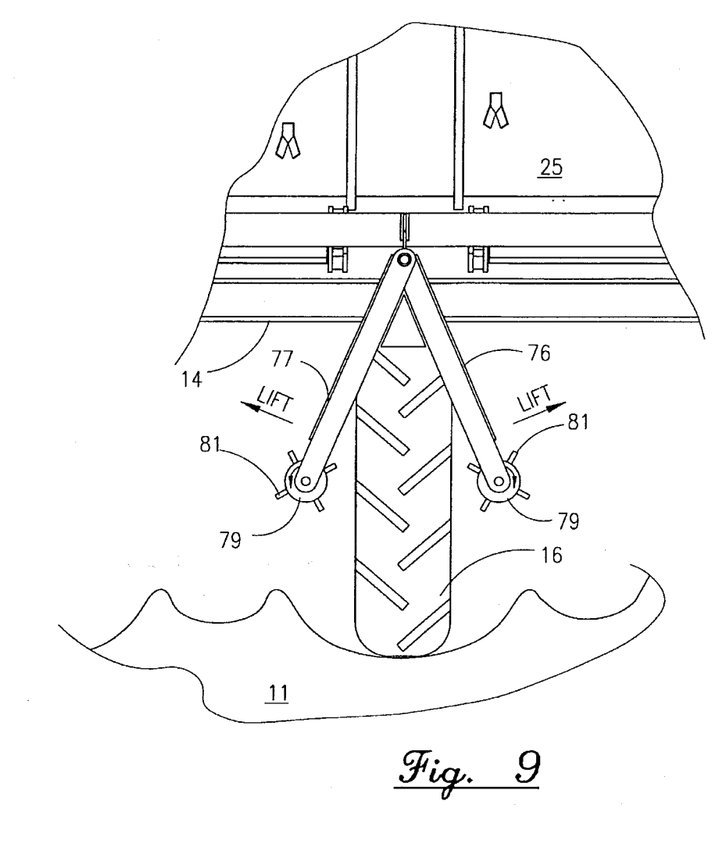
FIG. 9 is a vertical, fragmentary, end view of a typical pair of secondary distribution drums.

A second problem occurs when the cane stalks 13 being distributed on the field 11 have been matted as a result of compaction or entangled with weeds or vines. It has been found that by dividing the cane stalks 13 in the chassis bed 17, as best seen in FIG. 4, into two or more rows with walls 24, the stalks 13 tend to remain in the upright position thus reducing most of the matting problem. Divider flanges 74,75, located on the primary distribution drum 25 as seen in FIG. 3 also help to segregate the stalks 13 for distribution in multiple rows. In operation the cane stalk 13 is pulled from the chassis bed 17 by the primary drum cleats 8 and directed towards the rows 12 a,b,c, by the inner and outer vee-ramps 76,77 and the containment ramps 78. It has also been found that a system of secondary distribution drums 79, as also seen in FIG. 3, can be provided as an option, to further enhance the distributing process by insuring that clumping does not occur as a result of matting, tangling or compaction. This secondary distribution process and distribution in three consecutive rows 12a,b,c is made possible as a result of the elimination of an operator positioned behind the primary distribution drum 25. As best seen in FIG. 5, and 6 a series of hydraulically motor 80 driven smaller drums 79 are provided with a set of fins 81 located around their periphery. These secondary drums 79 rotating in opposite directions take the cane stalks 13 from the inner and outer deflecting vee-ramps 76,77 and direct the stalks 13 singularly into the open rows 12 a,b,c, in a semi-parallel and overlapping pattern. These secondary rotating drums 79 as seen in FIG. 5–7, can be placed in a parallel or canted position and/or at obtuse angles depending on the pattern desired and the type and condition of the cane being planted. These rotating secondary distribution drums 79 further insure proper placement of the cane 13 in multiple open rows 12 a,b,c as illustrated in FIG. 2.

Figure 10:
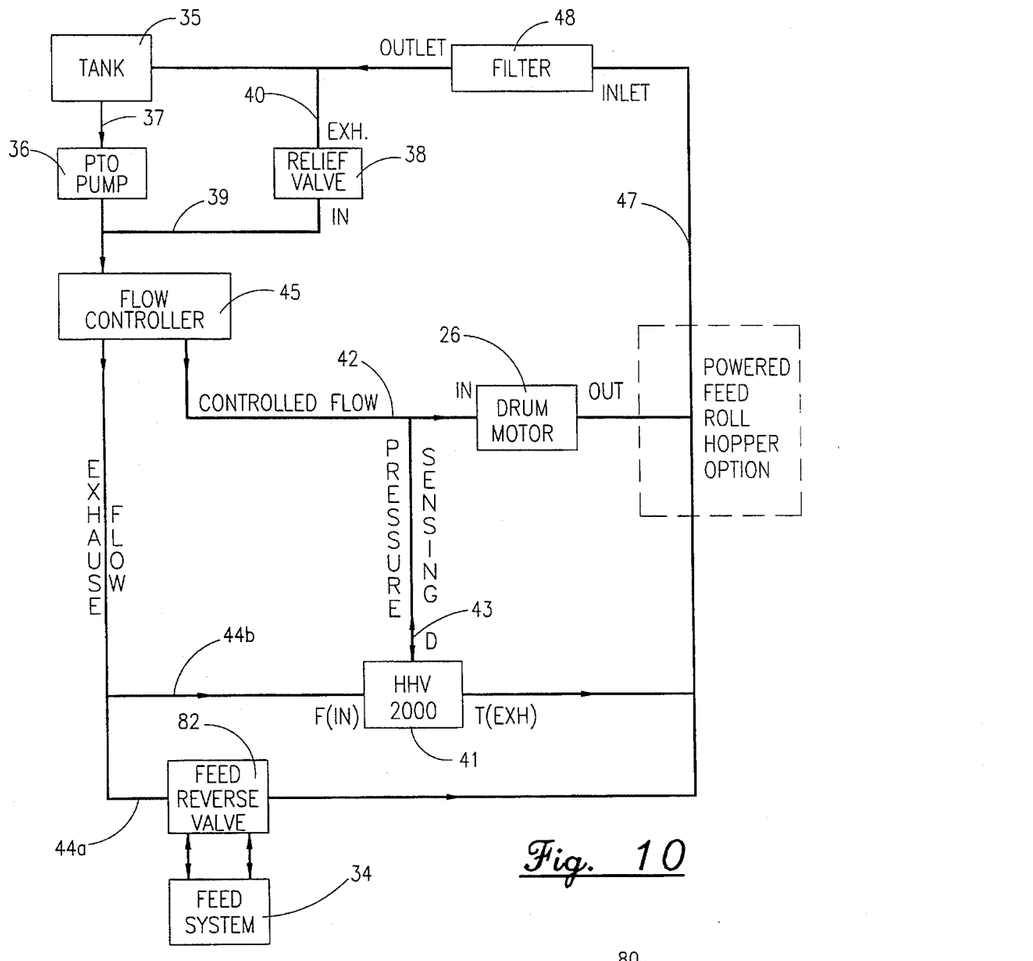
FIG. 10 is a block diagram of the hydraulic circuit for the preferred embodiment.
Figure 11:
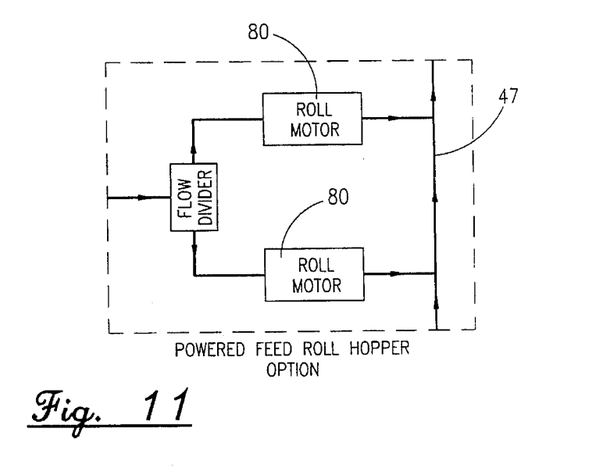
FIG. 11 is a partial diagram of the optional, hydraulic drive circuit for the secondary distribution drums.

In FIG. 10 a schematic diagram shows the hydraulic system for a planter 10 which includes the hydraulic drive components including the primary distribution drum motor 26 and drag type feed conveyor chain drive motor 34. The hydraulic system includes a tank 35 for storing hydraulic fluid and a pump 36 for transmitting hydraulic fluid to other components in the system. A suction line 37 carries hydraulic fluid from the tank 35 to a pump 36. A relief valve 38 protects the hydraulic pump 36 from over pressuring by allowing hydraulic fluid to be by returned to the tank via lines 39 and 40 in an over pressure situation. The variable flow controller 45 divides the hydraulic flow into two streams. One stream, directed through line 42 to the primary distribution drum 26, is prioritized and pressure compensated to insure constant flow to the primary distribution drum motor 26. The second stream is directed through lines 44a to the conveyor feed motor 34 and the special, pilot operated flow control valve 41. Flow is directed to the feed motor 34 via the feed directional control valve 82.

The special flow control valve 41 senses pressure in the flow line to the primary distribution drum motor 26 via the sensing line 43 and compensates for pressure spikes in the primary drum motor 26 circuit by adjusting the fluid flow to the feed conveyor motor 34 by bleeding off a portion of its flow from line 44a through line 44b to the tank 35 via the tank return line 47, thus reducing the feed rate. The special flow valve 41 is designed to dampen the wildly oscillating pressure surges created as a result of the drastic differences in cane stalk 13 configuration and the environment in which it must be handled. Pressure variations in this circuit may vary between 400 psi to 2400 psi in a single revolution of the primary distribution drum 25. As a result of such wild variation, ordinary, pilot operated pressure relief and dump valves simply do not work due to valve chatter resulting from the small spring and spool movements associated with such valves, and they do not provide proportional flow as a result of averaging such spikes. Such valves would be required to operate hundreds of times per minute as a result of the high pressure spikes having very short durations. Therefore, it is essential to provide a large spring 58 which is sufficiently resilient to absorb most pressure spikes, having short durations, with little or no spool movement. However, longer duration pressure spikes react on the spool in a manner which provides only a partial orifice opening between ports 60, 61, thus proportionally bleeding off only enough fluid through outlet line 47 back to the tank 35 to release a portion of the pressure on the feed motor 34.

Fluid exiting both the primary distribution drum motor 26 and the conveyor feed motor 34 is returned to the tank 35 via the return line 47, and thus completes a circuit that is closed to outside contamination. A filter 48 is positioned in the return line 47 immediately before the tank 35 so that all hydraulic fluid returning through the return line 47 passes through filter 48 before entering the tank 35.

Figure 12:
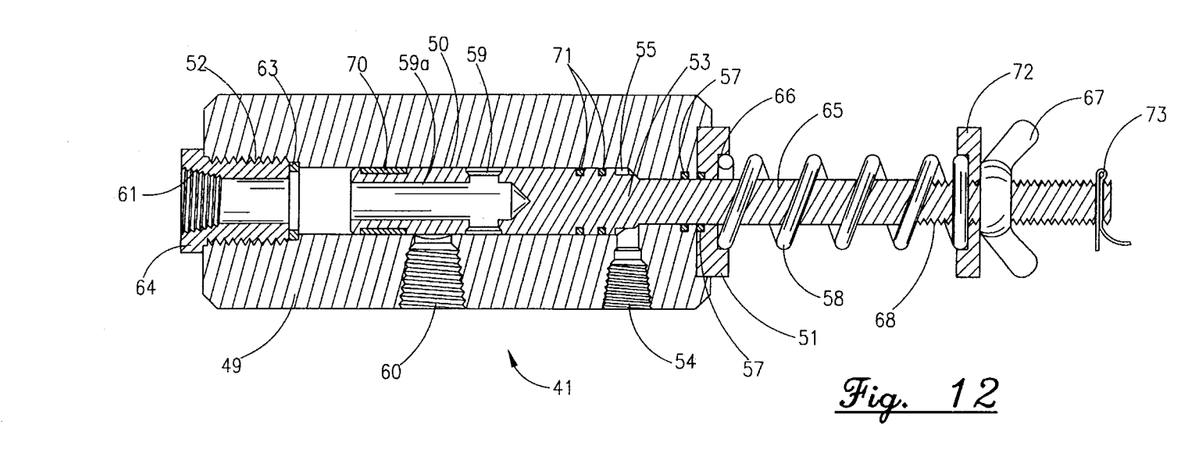
FIG. 12 is a cross, full section view of the special, hydraulic pressure, compensator valve exposing the sliding valve member.
Figure 13:
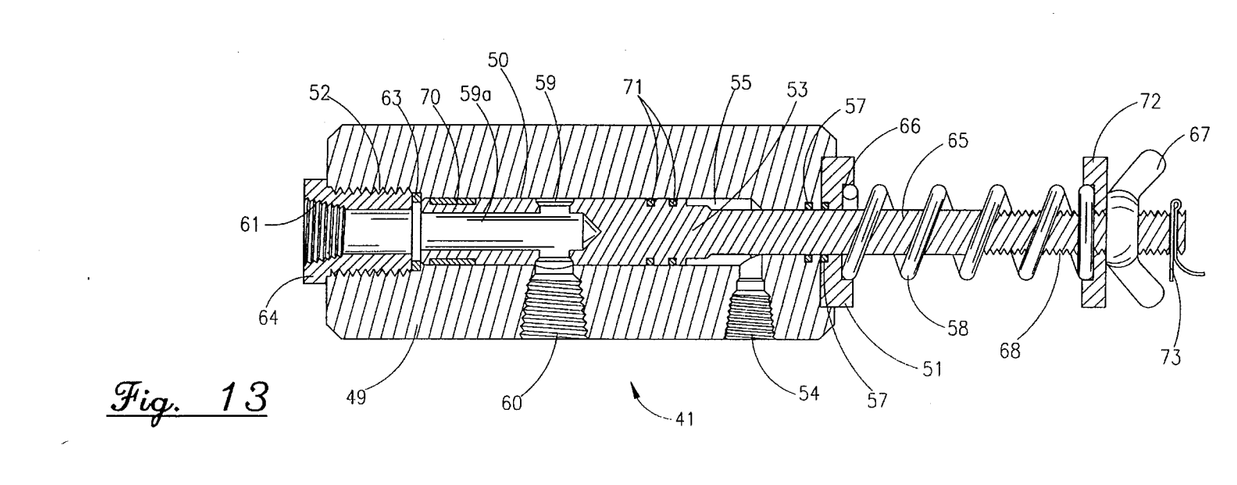
FIG. 13 shows a typical operating position of the special, hydraulic pressure, compensator valve.

In FIG. 12 the special compensator control valve 41 is shown more particularly. The control valve 41 includes a valve body 49 having an interior bore 50 and an outlet orifice reducer 64 that threadably engages the housing 49 at threads 52. However, the reducer 64 can be eliminated and the body 49 connected directly to a tank return line. A spool or piston 53 is disposed within the interior 50 of the housing 49. The spool 53 moves between a first closed position as shown in FIG. 12, and a second open position which allows the annular recess ports 59 in the spool 53 as seen in FIG. 13, to be positioned in alignment with the valve body port 60. FIG. 13 shows a typical operating position of the control valve wherein the pressure of hydraulic fluid at the primary distribution drum motor 26 is at an acceptable level. The port 54 of housing 49 is normally connected to the flow line 43 for sensing pressure in the primary distribution drum flow line 42.

In a situation wherein the hydraulic fluid pressure at the primary drum motor 26 spikes at a momentarily unacceptable level, the hydraulic fluid in space 55 reacts on the spool's displacement, thus causing the spool 53 to move in a manner which compresses the coil spring 58. The spool 53 has an annular recess 59 and internal passage which allows fluid to flow via the line 44b through the inlet port 60 to the exit port 61. The spring tension setting normally maintains the spool in an offset position whereby the annular recess 59 and its internal passage is closed to flow through the inlet port 60. Such a misalignment creates a restriction to hydraulic flow in the line 44b so that the conveyor feed motor 34 receives the maximum hydraulic flow available from the secondary flow path through the flow control valve 45. Any fluid bleed off this circuit through line 44b as a result of the proportional operation of the special pressure sensing valve 41 causes a slowing in the feed rate of cane stalks 13 to the rotating distribution drum 25 but does not affect the flow of hydraulic fluid via line 42 to the drum motor 26. In this fashion, the rotating distribution drum 25 continues to rotate at the same revolutions per minute, as a result of having priority, while the flow of cane stalks 13 being feed to the rotating primary distribution drum 25 slows, allowing the primary distribution drum 25 to clear any jam that has, in fact, created the over pressure of hydraulic fluid at the primary distribution drum motor 26. As seen in FIG. 12, if pressure at the primary distribution drum motor 26 increases to a predetermined level, and remains at that level for a significant duration, the spool or piston 53 in the valve will move a sufficient distance compressing the spring 58 so that the annular recess 59 of the piston 53 contacts engages the inlet port 63. Fluid is then allowed to move through a passage 59a to the outlet port 61, in a partially restricted manner, as a result of the damping action of the valve. In the position of FIG. 13, the piston 53 has shifted to engaged the stop ring 63 of the housing 49. In this position, the annular recess 59 is completely aligned with the inlet port 60, thus allowing full flow between ports 60 and 61. The spool 53 is fitted with a wear ring 70 and a pair of sealing o-rings 71, and the stem is sealed by o-rings 57 at the end of the valve body 49 and in the collar 51. The spool's stem portion 65 extends through a stem opening 66 in the collar 51. The stem portion 65 is threaded 68 to accept an adjusting washer 72 and locking wing nut 67. A retainer pin 73 is also provided to prevent the wing nut 67 from accidently backing off the stem 65. Unlike most relief or dump valves, where the relief pressure is generally fixed and is rarely changed, the threaded washer 72 of the special control valve 41 is continuously being adjusted by the operator to compress the coil spring 58, thus compensating for varying field conditions. Rotation of the threaded washer 72 compresses or decompresses the spring 58 as desired so that the pressure requirement needed to move the spool or piston 53 at the pressure sensing port 54 is either increased or decreased. The washer setting is locked in position with the wing nut 67.

Because many varying and different embodiments may be made within the scope of the inventive concept herein taught and because many modifications may be made in the embodiments herein detailed in accordance with the descriptive requirement of the law, it is to be understood that the details herein are to be interpreted as illustrative and not intended to limit the invention. LIST OF TERMS:

1.
2.
3.
4.
5. arrow direction
6.
7.
8. drum cleats
9.
10. planter
11. furrows
12a. row
12b. row
12c. row
13. cane stalks
14. chassis
15. wheel
16. wheel
17. bed
18. side wall
19. side wall
20. angled feed plate
21. conveyor drag chain
22. drive sprockets
23. slats
24. separator walls
25. primary distribution drum
26. primary hydraulic "drum"
27. rotating shaft
28. bearing
29. bearing
30. arm
31. arm
32. pivot
33. pivot
34. conveyor feed motor
35. hydraulic tank
36. hydraulic pump
37. suction line
38. relief valve
39. flow line
40. flow line
41. special control valve
42. flow line
43. pressure sensing line
44a. flow line
44b. flow line
45. variable flow divider
46. vent line
47. return line
48. filter
49. valve body
50. interior bore
51. end collar
52. threads
53. spool or piston
54. port
55. space
56.
57. o-ring
59. spool annular recess
58. spring
60. inlet port
61. outlet port
62. end portion
63. stop ring
64. outlet reducing orifice
65. spool stem portion
66. stem opening
67. adjustable wing nut
68. threads
69. conveyor shaft bearings
70. wear ring
71. O-rings
72. adjusting flat washer 73. retainer pin.
74. drum flange
75. drum flange
76. outer deflecting vee-ramp
77. inner deflecting vee-ramp
78. containment deflecting ramp
79. secondary distribution drums
80. secondary distribution drum motors
81. secondary dist. drum fins
82. feed reverse valve
83. tail shaft and sprocket
84.
85.

What is claimed as invention is:

1. A multi-row sugar cane planter comprising:
   a) a chassis;
   b) an undercarriage for moving said chassis along a cane field furrow;
   c) said chassis further including a bed means for containing cane stalks in at least two columns in a semi-vertical position for planting;
   d) a hydraulically driven, distribution means for transferring said cane stalks from said containment means to at least three consecutive rows in a cane field including one directly below said chassis;
   f) a pressure compensated hydraulically driven feed conveyor means for advancing said cane stalks, along said means for containing cane stalks, toward said distribution means; and
   g) a hydraulic control means for damping out high pressure spikes resulting from hesitation of said distribution means and automatically compensating by adjusting speed of said feed conveyor means relative to said hydraulically driven distribution means.

2. The multi-row sugar cane planter of claim 1 wherein said means for containing said cane stalks further comprises at least one syncline separator wall running the length of said bed, dividing said bed into approximately equal parts.

3. The multi-row sugar cane planter of claim 2 wherein said pressure compensated hydraulic feed conveyor means further comprises:
   a) head and tail sprockets, drive and tail shafts and at least two continuous parallel chains extending around said head and tail shaft sprockets;
   b) a plurality of slats attached between said parallel chains; and
   c) a semi-vertical angled feed plate attached to said chain means for feeding cane stalks, in the semi-vertical position, to said distribution means.

4. The multi-row sugar cane planter of claim 3 wherein said hydraulic feed conveyor means is reversible by the towing vehicle operator manually switching a valve located on said chassis adjacent the towing vehicle.

5. The multi-row sugar cane planter of claim 4 wherein said feed conveyor means is automatically reversed when reaching a pre-determined stop point.

6. The multi-row sugar cane planter of claim 1 wherein said means for containing said semi-vertical cane stalks is a rearwardly feeding planter.

7. The multi-row sugar cane planter of claim 1 wherein said hydraulically driven distribution means comprises:
   a) a pivotal hydraulically driven primary drum perpendicular to said cane row; and
   b) a deflecting ramp means located below said primary distribution drum for dividing the flow of cane stalks.

8. The multi-row sugar cane planter of claim 7 wherein said hydraulically driven distribution means further comprises a hydraulically driven secondary distribution means.

9. The multi-row sugar cane planter of claim 8 wherein said hydraulically driven secondary distribution means comprises:
   a) a rotating member located below and adjacent said deflecting ramp means, parallel to said cane row;
   b) separator means located peripherally and longitudinally around said rotating member for enhancing the separation and placement of cane stalks in said rows; and
   c) a hydraulic drive motor for driving said rotating member.

10. The multi-row sugar cane planter of claim 9 wherein said hydraulically driven secondary distribution means comprises at least two rotating members per row located perpendicular to said primary distribution drum.

11. A multi-row sugar can planter comprising:
    a) a chassis;
    b) an undercarriage for moving said chassis along a cane field furrow;
    c) said chassis further including a bed means for containing cane stalks in at least three columns in a semi-vertical position for planting;
    d) a hydraulically driven, primary and secondary distribution means for transferring said cane stalks from said containment means to at least three consecutive rows in a cane field including one directly below said chassis;
    f) a pressure compensated hydraulically driven feed conveyor means for advancing said cane stalks, along said means for containing cane stalks toward said distribution means; and
    g) a hydraulic control means for damping out high pressure spikes resulting from hesitation of said distribution means and automatically compensating by adjusting speed of said feed conveyor means relative to said hydraulically driven distribution means.

12. The sugar cane planter of claim 1 or 11 wherein said hydraulic control means comprises:
    a) a valve body;
    b) a valve member having a threaded stem extending beyond said body, sealed and slidably disposed within said valve body;
    c) a flow path within said valve member positionably communicative between open and closed positions with inlet and outlet ports in said valve body;
    d) port means in said valve body communicative with said valve member for displacing said valve member by hydraulic pressure;
    e) biasing means secured to said stem of said valve member for maintaining a selectable tension on said valve member;
    f) adjusting means threadably engaged with said stem threads for adjusting the tension on said biasing means.

13. The special valve of claim 12 wherein said biasing means is an externally exposed wire coil spring, the tensioning of which, is set according to varying field conditions rather than system pressure limitations.

14. The special valve of claim 12 wherein said biasing means is sufficiently resilient to absorb pressure surges, of short duration, reacting on said valve member in a proportional manner, moving said valve member between a partially open position to a full open position.

* * * * *